United States Patent [19]
Check et al.

[11] Patent Number: 5,915,960
[45] Date of Patent: Jun. 29, 1999

[54] DIRECT GAS-FIRED HEATING AND VENTILATION SYSTEM WITH PASSIVE CONTROL DAMPER

[75] Inventors: Chris B. Check, Wausau; Jay J. Schmidt, Edgar; Bruce L. Knieriem, Wausau, all of Wis.

[73] Assignee: Greenheck Fan Corporation, Schofield, Wis.

[21] Appl. No.: 08/949,261

[22] Filed: Oct. 13, 1997

[51] Int. Cl.⁶ ....................................................... F24H 3/02
[52] U.S. Cl. .......................... 432/222; 432/56; 126/110 C
[58] Field of Search ................... 454/236, 234, 454/259; 126/110 A, 110 C; 432/55, 56, 57, 222, 72

[56] References Cited

U.S. PATENT DOCUMENTS

| | | | |
|---|---|---|---|
| 3,417,977 | 12/1968 | Nelson et al. | 263/19 |
| 3,591,150 | 7/1971 | Weatherston et al. | 263/19 A |
| 3,765,398 | 10/1973 | Morris | 126/110 B |
| 4,278,423 | 7/1981 | Siccardi et al. | 432/222 |
| 4,289,447 | 9/1981 | Parker et al. | 364/505 |
| 4,325,352 | 4/1982 | Dickes et al. | 126/110 |
| 4,429,679 | 2/1984 | Dickes et al. | 126/110 |
| 4,573,912 | 3/1986 | Albitton et al. | 432/222 |
| 4,674,475 | 6/1987 | Powis et al. | 126/110 |
| 4,887,641 | 12/1989 | Alley | 137/601 |
| 4,917,074 | 4/1990 | Brekke et al. | 126/110 |
| 5,257,958 | 11/1993 | Jagers et al. | 454/238 |
| 5,597,354 | 1/1997 | Janu et al. | 454/229 |

*Primary Examiner*—Teresa Walberg
*Assistant Examiner*—Gregory A. Wilson
*Attorney, Agent, or Firm*—Quarles & Brady, LLP

[57] ABSTRACT

A gas-fired heating and ventilation system includes a blower which draws air through a recirculation damper from a building and through a direct gas-fired burner from a fresh air inlet. A passive control damper is mounted to bypass air around the burner and to thereby regulate the air flow through the burner for optimum combustion over a wide range of operating conditions.

11 Claims, 3 Drawing Sheets

DIRECT GAS-FIRED HEATING AND VENTILATION SYSTEM WITH PASSIVE CONTROL DAMPER

BACKGROUND OF THE INVENTION

The field of the invention is direct gas-fired heating and ventilation systems for industrial and commercial buildings, and particularly to systems which use variable amounts of fresh air.

Direct gas-fired heating and ventilating systems provide heated make-up air to buildings by drawing fresh air in from outside the building. Such make-up air is necessitated by the loss of heated inside air through open doors, chimney flues and exhaust fans. To prevent infiltration of cold outside air, it is common practice to provide more make-up air than is lost so that a slight positive pressure is maintained inside the building. The operation of the heating and ventilation system is controlled to maintain a selected inside air pressure and temperature.

There are two basic types of direct gas-fired heating and ventilating systems in use. One type includes a fresh air intake which communicates with a chamber containing a burner that heats the air as it is drawn or blown over the flame by a blower. The heated air is exhausted into the building. In some systems the blower speed is controlled to vary the amount of heated make-up air generated, and in other systems the fan is operated at a constant speed and is turned on and off as needed. Example systems of this type are disclosed in U.S. Pat. Nos. 4,325,352; 3,591,150 and 4,278,423.

The second basic type of system recirculates inside air and mixes it with the heated fresh air before delivering it to the inside space. These systems include a recirculating air intake which draws air from inside the building and mixes it with the heated fresh air. Dampers control the relative amounts of each air stream. Examples of this type of direct gas-fired heating and ventilating system are disclosed in U.S. Pat. Nos. 3,417,977; 4,674,475; 4,573,912; 4,429,679 and 4,917,074.

For proper combustion it is imperative that the air stream over the direct gas-fired burner be maintained at a constant velocity. This requires that the pressure drop across the burner be maintained at a relatively constant level. In the above-cited patents this is achieved by controlling dampers that supply air to the burner or dampers that shunt air around the burner. In all cases, the dampers are either controlled by complex interlocking mechanisms or are separately controlled by electronic controllers such as those disclosed in U.S. Pat. Nos. 4,829,447; 5,597,354 and 5,257,958.

SUMMARY OF THE INVENTION

The present invention is a passive damper for regulating the pressure drop over a direct gas-fired burner. More particularly, a direct gas-fired burner is mounted in a first opening in a chamber to receive air supplied to the chamber through an air intake and a passive damper is mounted in a second opening in the chamber to shunt a portion of the intake air around the direct gas-fired burner, wherein the passive damper is responsive to the pressure drop across the second opening to control the amount of shunted air and to thereby maintain the pressure drop across the direct gas-fired burner substantially constant. A simple spring or weight coupled to the passive damper blades provides a bias force which closes the damper when the air flow to the direct gas-fired burner decreases. When the air flow increases, the damper blades are forced open by the increased air pressure against the bias force to shunt the increased air flow around the burner.

A general object of the invention is to maintain the pressure drop constant across a direct gas-fired burner. The passive damper blades open and close as is necessary to shunt air supplied to the burner in excess of that required to provide the optimal burner performance. The passive damper thereby "regulates" the pressure drop and the air velocity across the burner.

Another object of the invention is to passively regulate the pressure drop across the burner. No control system or interconnecting linkages are required to operate the passive damper. The bias force which closes the damper blades can be provided by a simple spring or weight. The bias force is set to precisely compensate for changes in air flow and the geometry of the damper is set to operate at the pressure level required by the direct gas-fired burner.

A more specific object of the invention is to provide a reliable and inexpensive regulator of the pressure drop across a burner. No control systems are required and no complex mechanical linkages are needed to operate the passive damper. It operates autonomously to perform the regulation function.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

DESCRIPTION OF THE PREFERRED EMBODIMENT

Figure 1:
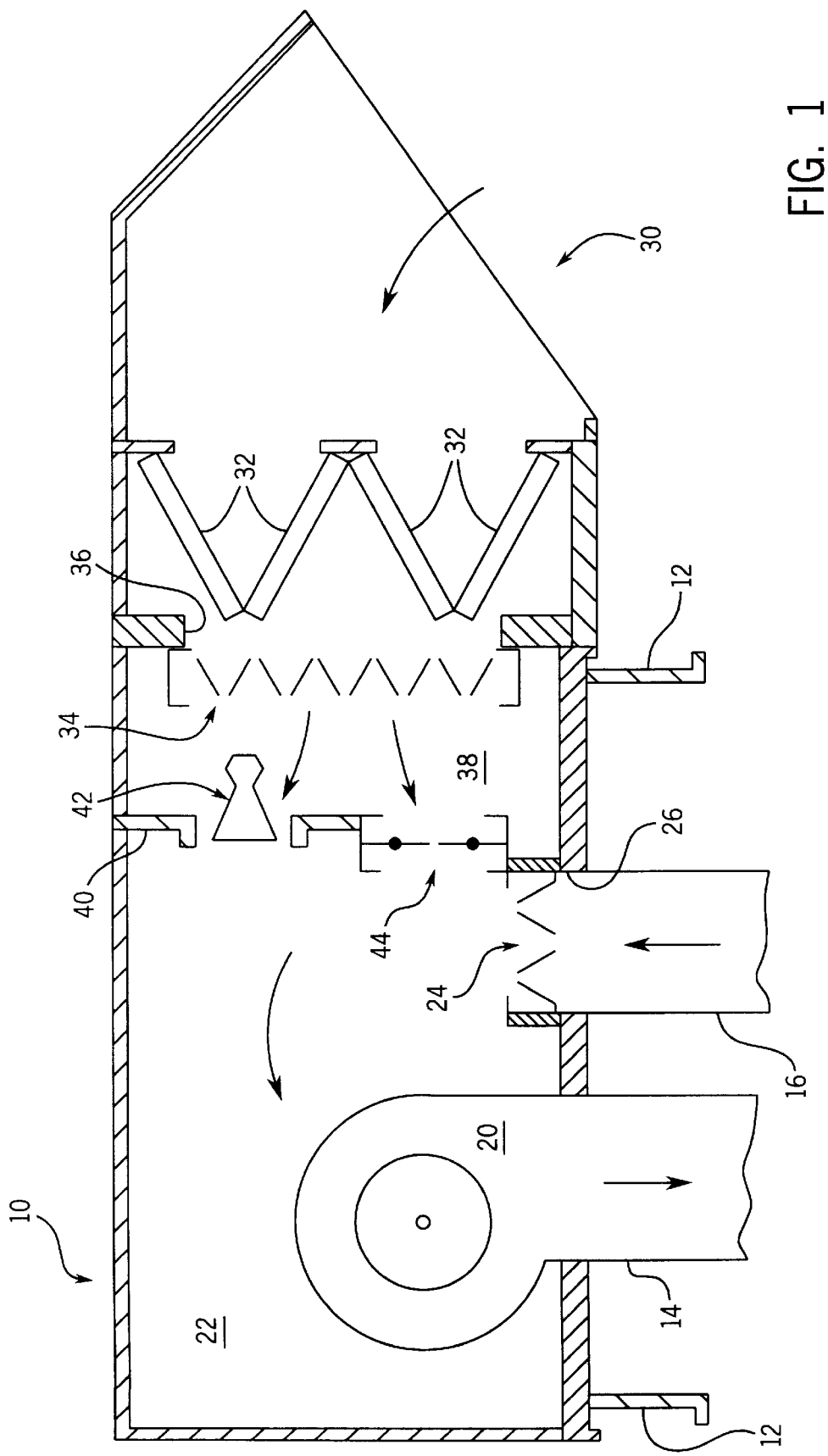
FIG. 1 is an elevation view of a recirculating heating and ventilation system which employs the preferred embodiment of the invention.

Referring particularly to FIG. 1, the preferred embodiment of the invention is a recirculating heating and ventilation system 10 which is mounted on a roof curb 12 and connected to air ducts 14 and 16 of a building (not shown). A centrifugal blower 20 connects to the air duct 14 and draws air from an enclosed blower chamber 22 and delivers it to the building through the air duct 14. Air is returned from the building through air duct 16 and the volume of this recirculated air is controlled by a recirculation damper 24 mounted in an opening 26 formed in the bottom of the system 10. Return air from the building mixes with fresh air and is drawn into the chamber 22 by the blower 20. The blower 20 and recirculating damper 24 are operated in a well known manner by a control system (not shown) to provide the proper amount of air to the building and to recirculate a certain portion of that air.

The recirculated air is mixed with fresh outside air that is drawn in by the blower 20 through a weatherhood 30. A set of air filters 32 are mounted in the stream of fresh outside air and an inlet damper 34 is mounted over an air inlet opening 36 to control the amount of fresh air that passes through the air inlet opening 36. The inlet damper 34 is operated by the same control system that operates the blower 20 and recirculating damper 24.

The fresh air drawn through the inlet damper 34 enters an air inlet chamber 38 located adjacent the mixing chamber 28. A dividing wall 40 between these two chambers 28 and 38 has two openings through which the fresh air may be drawn into the mixing chamber 28. A direct, gas-fired burner 42 is mounted in one of these openings, and a passive control damper 44 is mounted in the other opening. The burner 42 heats that portion of the fresh air drawn through the first opening, and the passive control damper 44 shunts the remaining portion of the fresh air around the burner 42. As will be described in more detail below, the passive control damper 44 regulates the air pressure drop across the second opening in the dividing wall 40 as the fresh air passes around the burner 42 on its way to the mixing chamber 28, and in this manner it regulates the pressure drop across the first opening containing the burner 42. A constant air pressure drop across the burner 42 insures that the proper constant air velocity is maintained at all times for proper combustion. As will now be explained, this is achieved without any active control of the damper 44.

Figure 2:
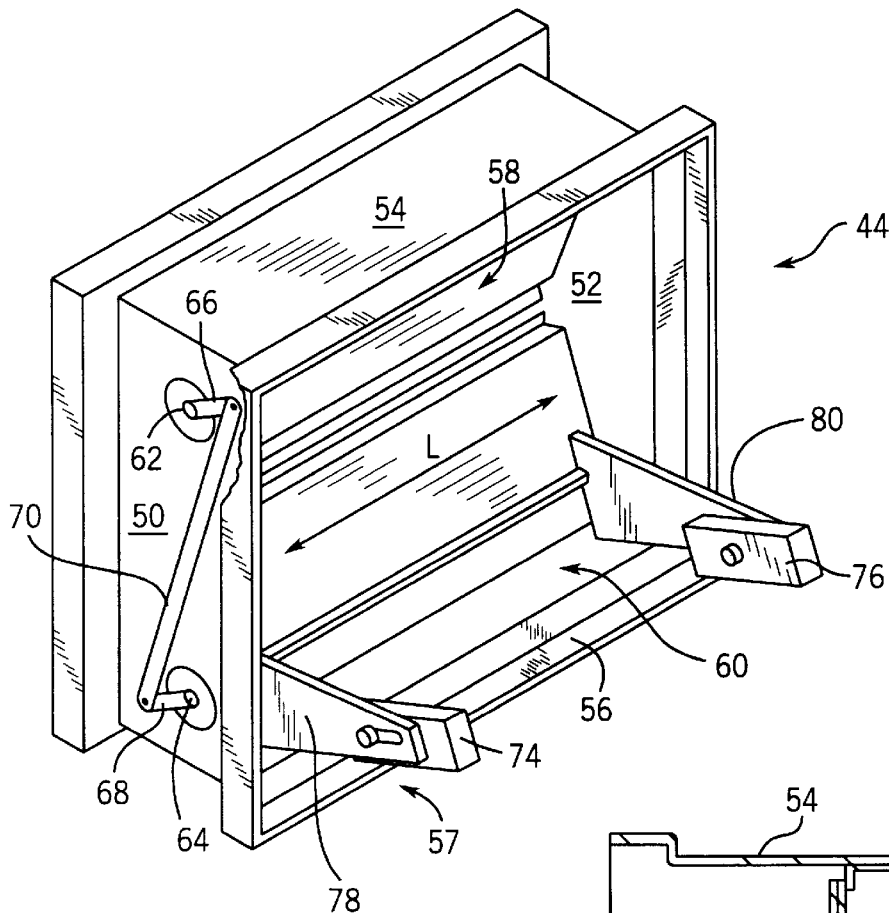
FIG. 2 is a perspective view of the passive damper which forms part of the system of FIG. 1.
Figure 3:
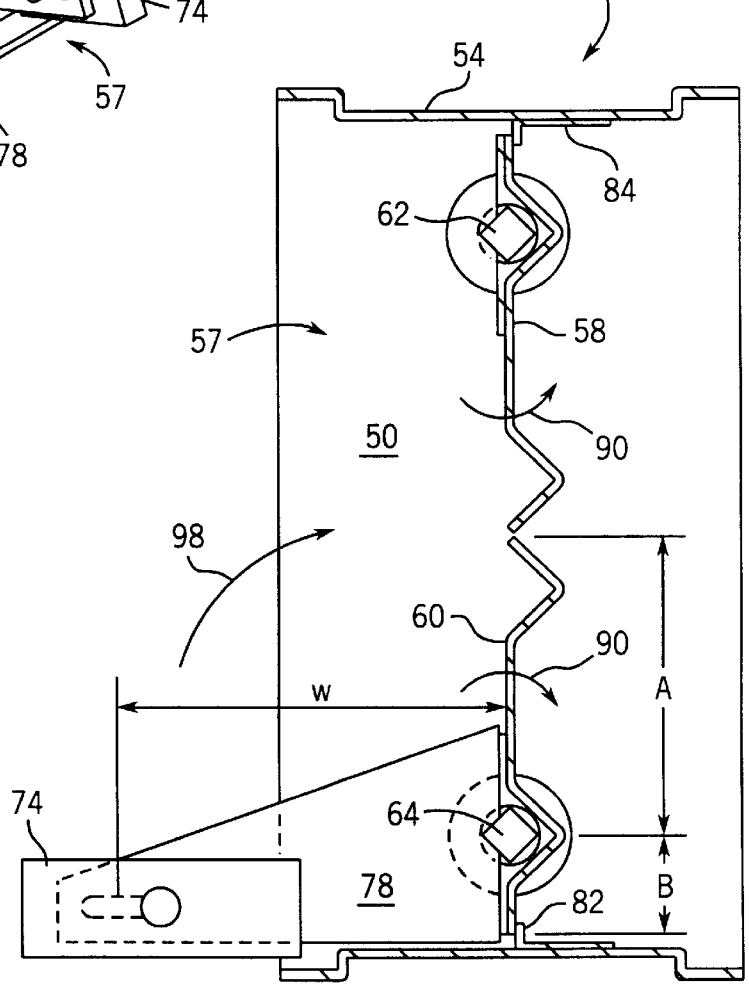
FIG. 3 is a partial view in cross-section taken through the blades of the passive damper in FIG. 2.

Referring particularly to FIGS. 2 and 3, the passive control damper 44 includes a rectangular frame formed by a pair of spaced, vertical sidewalls 50 and 52, a top wall 54 and a bottom wall 56. The frame defines a rectangular opening 57 in which two damper blades 58 and 60 are mounted for rotation about two horizontal shafts 62 and 64. The shafts 62 and 64 extend across the width of the opening 57 and are rotatably fastened to the sidewalls 50 and 52. As shown in FIG. 2, the shafts 62 and 64 extend through the sidewall 50 and a three part linkage couples them together so that they rotate together. The linkage includes arms 66 and 68 which extend radially outward from respective shafts 62 and 64, and a connecting bar 70 which links the ends of these arms together as shown. As a result, when the lower shaft 64 rotates in one direction a specific amount, the upper shaft 62 rotates the same amount in the opposite direction. The weight of the "opposed action" damper blades 58 and 60 counterbalance each other such that there is no increase in torque as the blades are rotated throughout their range of motion. Ball bearings (not shown) may be used to reduce friction.

When the damper blades 58 and 60 are in their closed position as shown in FIG. 3, they substantially fill the rectangular opening 57 and block air flow through it. The damper blades 58 and 60 are biased in this closed position by weights 74 and 76 which are carried on supporting arms 78 and 80 that attach to the lower damper blade 60. The weights 74 and 76 provide a bias force that rotates the lower blade 60 closed against a stop 82 mounted along the bottom wall 56. A similar stop 84 is mounted along the top wall 54 for the upper damper blade 58, and both stops 82 and 84 also serve to seal along one edge of the damper blades 60 and 58 when they are fully closed. Their seals reduce leakage when the damper 44 is closed.

When the air pressure increases on the input side of the passive control damper 44, a force acts on the damper blades 58 and 60 which causes them to rotate open as indicated by the arrows 90 in FIG. 3. The greater the pressure drop across the passive control damper 44 the greater the opening force and the more the damper blades 58 and 60 will open. As will be explained in more detail below, the geometry of the damper 44 determines precisely how it reacts to changes in air pressure to open or close and to thereby change the volume of air flowing through the opening 57.

Referring again to FIG. 1, the passive control damper 44 is designed to regulate the air velocity across the burner 42. It does this by shunting a portion of the fresh air around the burner 42 in response to changes in air pressure. The opening profile of the burner 42 is set to handle a fixed percentage of the total air flow generated by the blower 20 (e.g. 20% minimum typically) when the air velocity across the burner 42 is at the optimal level for combustion. This establishes an optimal pressure drop across the burner opening in the dividing wall 40. With the recirculating damper 24 fully open, the balance of the air flow (80%) flows through it. Under this condition the pressure drop across the passive control damper 44 is equal to that across the burner 42 and the damper weights 74 and 76 are selected to completely close the damper 44 so that it does not shunt any air. The system may also be set up so that at a minimum outside air setting the passive control damper 44 shunts a small amount of outside air (e.g. 5% to 10%). Thus, if variations in external conditions change (e.g. the filters 32 become dirty) the damper 44 can adjust closed to maintain static burner conditions.

As the recirculation damper 24 is closed to reduce the volume of recirculated air below 80%, the volume of fresh air must increase above the 20% required by the burner 42 to make up the difference. This increased fresh air flow results in a slight increase in the pressure drop across the burner 42 and the passive control damper 44 "sees" this pressure increase. The increased pressure drop across the second opening opens the damper blades 58 and 60 to shunt the excess fresh air around the burner 42. With the recirculation damper 24 fully closed, the passive control damper 44 is open and is designed to bypass, or shunt, 80% of the total air flow. Thus, without any mechanical linkage or electronic control, the passive control damper 44 responds automatically to changes in the recirculation damper 24 to regulate the air flow through the burner 42 at the optimal level.

The passive control damper 44 also responds to airflow variations caused by other factors. Such variations may be due to internal changes such as dirty filters 32, damper misadjustment, blower speed misadjustment, blower belt slippage, dirty blower wheels, etc. External causes of airflow variations include windage, frost build-up, temperature changes, duct losses, building pressurization, etc. Regardless of the cause, the passive control damper 44 automatically responds to pressure changes across the burner opening to shunt the proper amount of air around the burner 42 and to thereby regulate the airflow therethrough at the optimal amount.

Figure 4:
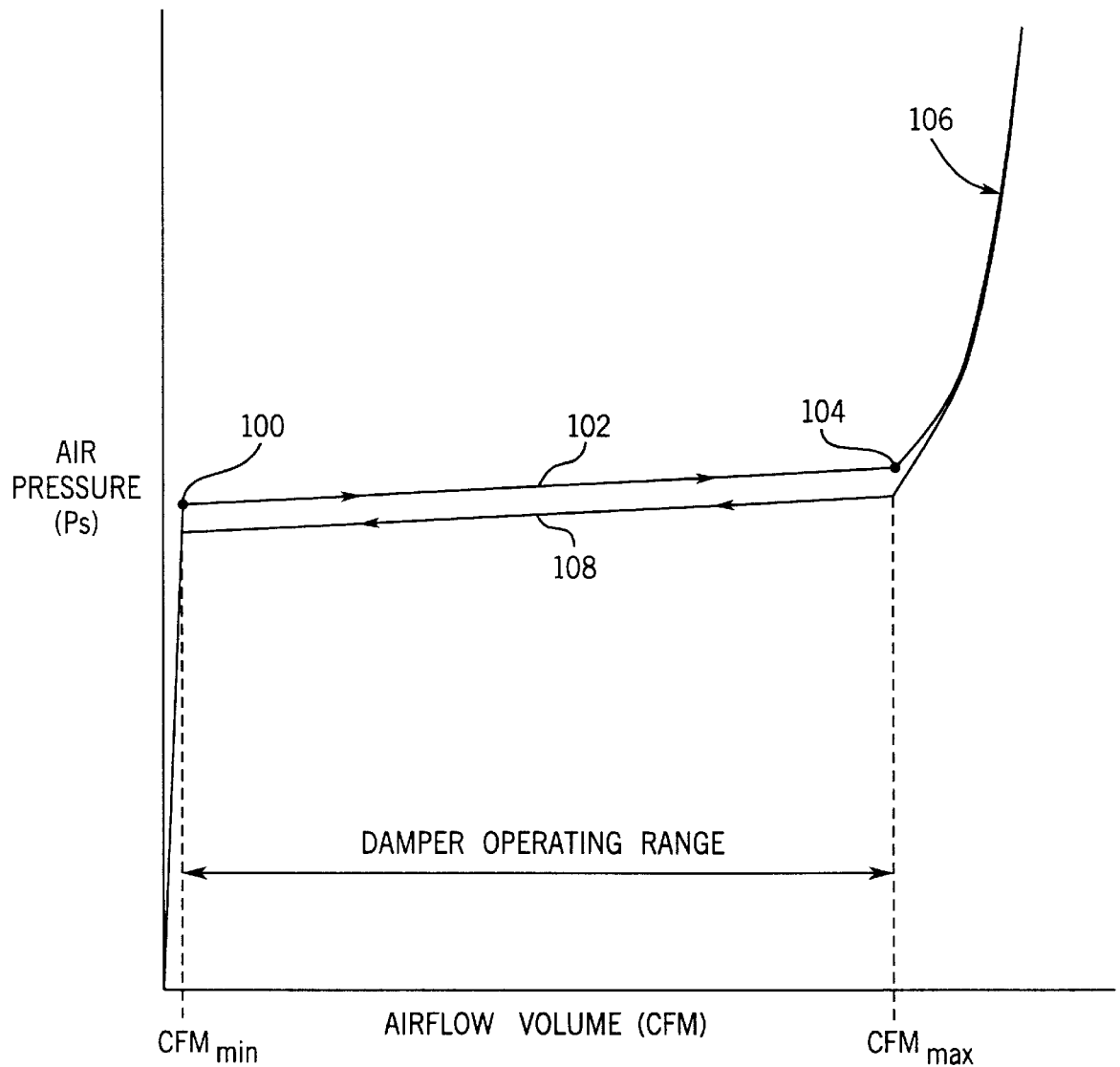
FIG. 4 is a graph of an exemplary airflow curve for the passive damper of FIG. 2.

The geometry of the passive control damper 44 determines the manner in which it operates. Referring particularly to FIG. 4, when the air pressure ($P_s$) is very low across the damper 44, its blades are closed and there is very little airflow (CFM). As the air pressure increases, some leakage airflow occurs before the damper blades 58 and 60 begin to open at the point 100. The leakage airflow ($CFM_{min}$) at the point 100 is the lower end of the damper operating range. As the air pressure $P_s$ increases further above the point 100, the damper blades 58 and 60 open and begin to shunt airflow. The airflow curve has a small up slope at this segment 102 because the air pressure does increase slightly to open the damper blades further for increased airflow (CFM). When the damper blades are fully open at the point 104, any further increase in airflow (CFM) will dramatically increase the air pressure along a resistance curve 106 for a fixed opening. The point 104 defines the upper limit ($CFM_{max}$) of the damper operating range. When the pressure drops, the airflow curve follows a segment 108 in the damper operating range that is parallel to, but slightly below the segment 102. This "hysteresis" is due to resistance in the rotation of the damper blades 58 and 60.

The mechanical design of the damper 44 determines the shape of the airflow curve. The operating range of the damper 44 is determined by its size ($CFM_{max}$) and the air leakage ($CFM_{min}$). The air pressures ($P_s$) over which the damper 44 operates, and the precise shape and slope of the segments 102 and 108 are determined by a number of physical parameters. Referring particularly to FIGS. 2 and 3, the torque on the blade 60 due to air pressure is a function of the blade length (L) and width (A+B). However, the force produced on that portion (A) of the blade 60 is offset by that portion (B) of the blade 60 located on the other side of the shaft 64. In addition, the opening torque is maximum when the blade 60 is perpendicular to the air stream (i.e. fully closed), but the opening torque decreases as its projected area decreases during blade opening.

The closing bias torque provided by the weights 74 and 76 is set to equal the opening torque produced by the blades 58 and 60 when the air pressure ($P_s$) reaches the point 100 in the airflow curve of FIG. 4. This is substantially the same air pressure ($P_s$) that should occur across the burner 42 for optimal airflow through it. As shown in FIG. 3, the closing torque provided by weights 74 and 76 is the product of their weight and the length (w) of the supporting arms 78 and 80. The amount of weight can be changed to adjust the operating pressure, or the location of the weights on the arms 78 and 80 can be adjusted to change the distance w. Because the supporting arms 78 and 80 extend substantially perpendicular from blade 60, the effective length (w) is maximum when the blade is closed, but decreases as the blade opens and lifts the weights upward in an arc indicated by arrow 98. This closing bias torque is thus reduced as the blades open to match the reduced opening torque produced by air pressure on the blades 58 and 60. The better the match between the opening and closing torques at all blade angles, the flatter and straighter the segments 102 and 108 in the airflow curve of FIG. 4.

For perfect regulation of the air pressure across the burner 42, the segments 102 and 108 in the airflow curve for the passive control damper 44 should be straight and flat, and there should be no hysteresis. In other words, throughout the damper operating range the air pressure $P_s$ across it and the burner 42 which it shunts should remain constant. In practice this is difficult to achieve and it can lead to an unstable damper that will oscillate under dynamic operating conditions. A certain amount of resistance or damping of blade rotation is, therefore, desirable to maintain stability at the expense of small variations in the regulated air pressure $P_s$.

It should be apparent to those skilled in the art that many variations are possible from the preferred embodiment of the invention without departing from the spirit of the invention. The design of the passive control damper 44 can be varied in a number of ways. The number, size and shape of the damper blades and the opening which they control can vary from one application to the next. While rotation of the damper blades about a horizontal axis is shown in the preferred embodiment, the orientation of the blades in the opening and their axis of rotation can vary. Indeed, the blade action need not necessarily be rotary. The mechanism for producing the bias force on the damper blades can also take many forms. For example, one or more springs may be used to produce the bias force and mechanical cams and linkages may be used to tailor the force to match the air pressure force acting on the damper blades throughout their operating range.

The number, size and arrangement of the passive control damper in the heating system can also be varied. For example, two or more passive control dampers may be disposed around the burner 42 in order to even out the air flow through the burner. It is also possible to shunt air around the burner by locating the passive control damper in other walls of the heating system. For example, the passive control damper 44 can be located in the recirculation air duct 16 and an active control damper may be mounted in the divider wall 40 to shunt air around the burner 42. In this arrangement the active control damper is operated by the building control system to adjust the level of outside air. The passive control damper 44 in this embodiment adjusts the amount of recirculated air to maintain the desired static pressure drop across the burner 42. A portion of the air drawn by the blower 20 into the blower chamber 22 is recirculated by the damper 44 and is thereby indirectly shunted around the burner 42. This arrangement does not provide the same degree of regulation as the direct shunt of the preferred embodiment, and a second, much smaller, passive control damper 44 may also be mounted in the divider wall 40 along with the active control damper to adjust for changes in the fresh intake air pressure that are not "seen" by the passive control damper 44 mounted in the recirculating air duct 16.

While the invention is shown embodied in a heating system in which air is recirculated, the present invention is also particularly well suited for use in a variable volume system in which air is not recirculated through the blower. In such a system there is no recirculation duct 16 or damper 24 and the volume of air delivered by the blower 20 is changed by changing the blower speed or the inlet damper. Within its operating range, the passive control damper 44 operates to maintain static conditions across the burner 42 as the total air drawn in from outside is changed.

We claim:

1. In a heating system having an air inlet chamber and a blower chamber separated by a dividing wall, a direct gas-fired burner mounted in a first opening in the divider wall to heat air flowing through the first opening from the air inlet chamber to the blower chamber, the improvement comprising:

a passive control damper mounted in a second opening coupled to the blower chamber to shunt air around the direct gas-fired burner and to thereby regulate the flow of air through the first opening to a substantially constant level, the passive control damper including:

a frame which defines the second opening;

a damper blade mounted to the frame for motion between a closed position in which the damper blade substantially blocks the flow of air through the second opening, and an open position in which air can freely pass through the second opening; and passive bias means coupled to the damper blade for applying a force which moves the damper blade toward its closed position and which has a magnitude that is substantially equal to an air pressure force acting on the damper blade over a range of air flow volumes shunted through the second opening.

2. The improvement as recited in claim 1 in which the passive control damper includes a second damper blade which is linked for rotation with the damper blade and cooperates with the damper blade to block the flow of air through the second opening when rotated to the closed position.

3. The improvement as recited in claim 2 in which the two damper blades are linked for opposed action.

4. The improvement as recited in claim 1 in which the bias means includes:

a supporting arm fastened to the damper blade; and a weight fastened to the supporting arm.

5. The improvement as recited in claim 4 in which the damper blade rotates about an axis and a supporting arm extends radially outward from the damper blade's axis of rotation and the weight is lifted as the damper blade rotates from its closed position to its open position.

6. The improvement as recited in claim 5 in which the supporting arm is substantially horizontal when the damper blade is in its closed position.

7. The improvement as recited in claim 1 in which the heating system includes a blower in the blower chamber which draws air into the blower chamber through said first and second openings.

8. The improvement as recited in claim 7 in which a recirculation damper is mounted in a third opening coupled to the blower chamber and the blower also draws air into the blower chamber through the recirculation damper, wherein the amount of air drawn through the recirculation damper is controlled by the recirculation damper.

9. The improvement as recited in claim 1 in which the air inlet chamber has an opening for receiving fresh outside air and the blower chamber has an opening through which air is blown into a building by a blower.

10. The improvement as recited in claim 9 in which filters are mounted in the air inlet chamber to filter the fresh outside air flowing into the air inlet chamber.

11. The improvement as recited in claim 1 in which the second opening is formed in the dividing wall.

\* \* \* \* \*